(12) United States Patent
Okuda et al.

(10) Patent No.: US 6,258,433 B1
(45) Date of Patent: Jul. 10, 2001

(54) OPTICAL RECORDING MEDIUM

(75) Inventors: Akira Okuda, Sakai; Tetsuo Imada, Neyagawa; Shigeru Namiki, Kadoma; Masahiro Yamamoto; Mikio Takebayashi, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,005

(22) Filed: Aug. 3, 1999

(30) Foreign Application Priority Data

Aug. 5, 1998 (JP) .................................................. 10-221772

(51) Int. Cl.[7] ........................................................ B32B 3/02
(52) U.S. Cl. ...................... 428/64.1; 428/64.4; 428/64.5; 428/64.6; 428/457; 428/913; 430/270.12; 430/495.1; 430/945; 369/283; 369/288
(58) Field of Search ................................... 428/64.1, 64.2, 428/64.4, 64.5, 64.6, 457, 913; 430/270.12, 495.1, 945; 369/283, 288

(56) References Cited

U.S. PATENT DOCUMENTS

| | | | | |
|---|---|---|---|---|
| 5,645,908 | * | 7/1997 | Shin | 428/64.1 |
| 5,679,429 | * | 10/1997 | Hintz | 428/64.1 |
| 5,702,792 | * | 12/1997 | Iida | 428/64.1 |
| 5,766,717 | * | 6/1998 | Kaneko | 428/64.1 |
| 5,817,389 | * | 10/1998 | Ono | 428/64.1 |

* cited by examiner

*Primary Examiner*—Elizabeth Evans
(74) *Attorney, Agent, or Firm*—Jordan and Hamburg LLP

(57) ABSTRACT

A half-transmissive film of an optical disk is formed using a Cu oxide instead of Au, while achieving similar reflectivity characteristics to those of Au. Alternatively, the half-transmissive film may comprise a compound of Cu with a corrosion-resistant material, or a stack of layers comprising a lower layer film of Cu, Ag, or Al and an upper layer film of a corrosion-resistant material. Further, the half-transmissive film may comprise $ZnS.SiO_2$, a nitride of Ti, indium-tin-oxide, or an alloy of Au and Cu or a compound including Au and Cu.

11 Claims, 5 Drawing Sheets

OPTICAL RECORDING MEDIUM

BACKGROUND OF THE INVENTION

The present invention relates to an optical recording medium such as optical disks having a half-transmissive film.

As demands for an optical recording medium, such as optical disks, of higher density and smaller size increase, optical disks such as digital video disks (DVD) that allow two types of signals to be read from one side of the disk have been developed and are now available in the market. Such a one-sided disk has a double layer structure of a total-reflection film and a half-transmissive film.

Below, one example of a conventional one-sided, read-only dual layer DVD is described with reference to FIGS. 9A and 9B. FIG. 9A illustrates an actual construction of the disk while FIG. 9B is a conceptualized view of same. A first resin substrate 21 is made of, for example, polycarbonate (PC) or polymethyl methacrylate (PMMA). A half-transmissive film 22 of Au is deposited on a backside of the resin substrate 21 by sputtering or the like. A second resin substrate 23 is made of PC, PMMA or the like, and a total-reflection film 24 of Al deposited on a front surface of the second resin substrate 23 by means of sputtering or the like. These resin substrates 21, 23, on which respective layers have been formed, are bonded together with a transparent adhesive 25 made of a UV-curable photo-polymer or the like, thereby forming a one-sided double layer disk. A laser beam 26 of 650nm wavelength is shown and a a reflected beam 27 are shown. The laser beam 26 passes through the resin substrate 21 and is reflected by the Au half-transmissive film 22. A reflected beam 28 is produced when the laser beam 26 passes through the resin substrate 21, the Au half-transmissive film 22, the adhesive layer 25, and is reflected by the Al total-reflection film 24.

The one-sided, read-only double layer disk constructed as described above works as explained below. In this double layer disk, the reflectivity of the Au half-transmissive film 22 is set to be equal to the reflectivity of the Al total-reflection film 24 relative to the wavelength of the laser light 26 for reproduction of data, whereby reproduction signals can be read equally from the two layers. For this reason, the reflective layer on the side on which the laser beam 26 is incident must be a half-transmissive film, and its reflectivity is generally set at 25 to 30% so as to equalize the reflected light 27 and 28.

The Au half-transmissive film 22 in the prior art exhibits the reflectivity characteristics required thereof, having a complex index of refraction of 0.19 and absorption coefficient of 3.5. Half-transmissive films are also demanded to be reliable not to change in outer appearance or reflectivity, due oxidization and corrosion, even in an environment under severe temperature and humidity conditions: The above described Au half-transmissive film 22 is also satisfactory in this regard, as it is made of a material which is remarkably resistant to oxidization and corrosion.

However, in the one-sided double layer disk described above, the use of Au for the half-transmissive film 22, which costs 20 to 30 times more than other metal or dielectric materials deposited by means of sputtering, raises the cost of disks considerably. If, by way of example, the price of Au is 1400 yen per gram, the price of the half-transmissive film 2 per one disk is 3.5 yen.

SUMMARY OF THE INVENTION

In view of the foregoing, an object of the present invention is to provide an optical recording medium which can be manufactured at a remarkably reduced cost by employing low-cost materials for the half-transmissive film.

To accomplish the above object, the present invention provides an optical recording medium having a half-transmissive film wherein the half-transmissive film comprises an oxide of Cu, whereby reflectivity characteristics similar to those of Au are achieved. Moreover, the use of an oxide deters promotion of oxidization, thereby avoiding changes in appearance or reflectivity due to oxidization and corrosion, and allowing production cost to be remarkably reduced due to the low material cost.

The half-transmissive film may comprise Cu mixed with a corrosion-resistant material, whereby reflectivity characteristics similar to those of Au are achieved. The use of a corrosion-resistant material added to Cu deters promotion of oxidization, thereby avoiding changes in appearance or reflectivity due oxidization and corrosion, and allowing production cost to be remarkably reduced due to the low material cost.

Preferably, the above corrosion-resistant material comprises one or a plurality of elements selected from a group consisting of Si, Mg, Mn, Cr, Sn, Al, and Be, and is added in a proportion of 25% or less so that the reflectivity of the half-transmissive film is 25 to 30% at 650 nm wavelength. It should be noted that the aforementioned reflectivity is defined to be a proportion of an amount of light reflected by the half-transmissive film relative to an amount of light incident onto the optical recording medium.

Alternatively, the half-transmissive film may comprise a stack of layers including an upper layer of a corrosion-resistant material and a lower layer of any of elements selected from a group consisting of Cu, Ag, and Al, whereby reflectivity characteristics similar to those of Au are achieved. The corrosion-resistant material of the upper layer deters the promotion of oxidization, thereby avoiding changes in the appearance or reflectivity due to oxidization and corrosion, and allowing production cost to be remarkably reduced due to the low material cost.

In the above structure, it is preferable that the lower layer has a thickness such that the reflectivity of the half-transmissive film is 25 to 30% at 650 nm wavelength, and the corrosion-resistant material of the upper layer comprises one or a plurality of elements selected from a group consisting of Si, Mg, Mn, Cr, Sn, Al, and Be, and has a thickness 30% or less of the thickness of the lower layer.

Furthermore, the present invention provides an optical recording medium having a half-transmissive film wherein the half-transmissive film comprises $ZnS.SiO_2$, whereby reflectivity characteristics similar to those of Au are achieved. Moreover, the use of an oxide deters the promotion of oxidization, thereby avoiding changes in the appearance or reflectivity due to oxidization and corrosion, and allowing production cost to be remarkably reduced due to the low material cost.

The half-transmissive film may comprise a nitride of Ti, whereby reflectivity characteristics similar to those of Au are achieved. Moreover, the use of a nitride deters the promotion of oxidization, thereby avoiding changes in the appearance or reflectivity due to oxidization and corrosion, and allowing production cost to be remarkably reduced due to the low material cost.

Alternatively, the half-transmissive film may comprise an alloy of Au and Cu or a compound consisting of a plurality of elements including Au and Cu, whereby reflectivity characteristics similar to those of Au are achieved. Moreover, the use of Au deters the promotion of oxidization, thereby avoiding changes in the appearance or reflectivity due to oxidization and corrosion, and since the mixing proportion of Au is reduced, production cost is remarkably decreased due to the low material cost.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

Preferred embodiments of an optical recording medium according to the present invention are hereinafter described with reference to FIG. 1 to FIG. 8.

Figure 1:
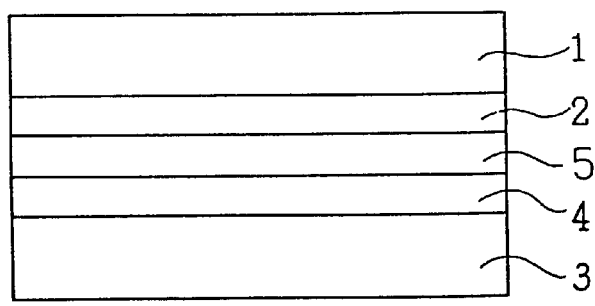
FIG. 1 is a schematic of a partial section of a first embodiment of an optical recording medium according to the present invention.
Figure 2:
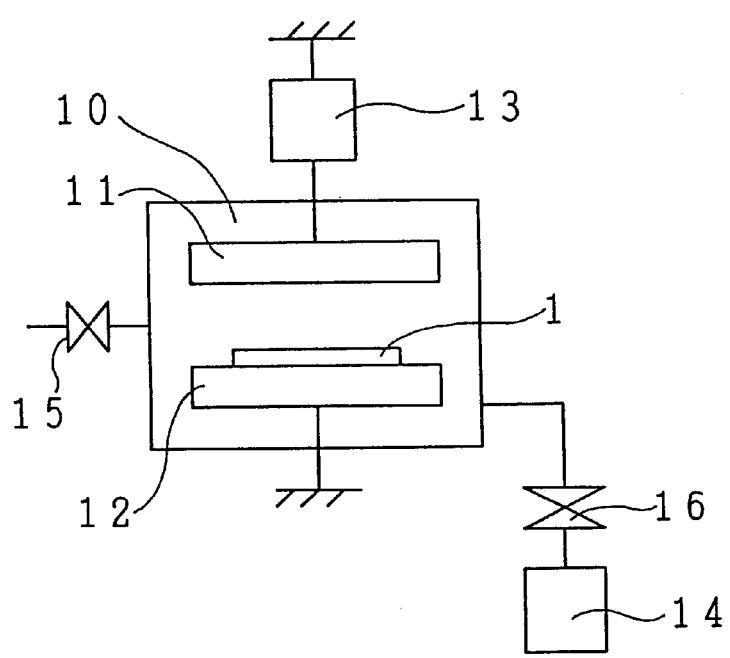
FIG. 2 is a schematic diagram showing a construction of a sputtering apparatus for forming a half-transmissive film in the first embodiment of the present invention.

A first embodiment of the present invention is described below with reference to FIG. 1 and FIG. 2. FIG. 1 is a conceptualized cross-sectional view of the optical recording medium of the present invention. A first resin substrate 1 is made of polycarbonate (PC) or polymethyl methacrylate (PMMA) or the like and a half-transmissive film 2 of Cu oxide is deposited on the backside of the resin substrate 1 by sputtering or the like. A second resin substrate 3 is made of PC, PMMA or the like, and a total-reflection film 4 of Al or the like deposited on a front surface of the second resin substrate 3 by means of sputtering or the like. The first and second resin substrates 1, 3 on which respective layers have been formed are bonded together with a transparent adhesive 5 made of a UV-curable photo-polymer or the like, thereby forming a one-sided, read-only double layer disk. The thickness of the half-transmissive film 2 should preferably be in the range of from 400 to 1000 angstrom, and should most preferably be 500 angstrom.

The Cu oxide, such as CuO or $Cu_2O$, forming the half-transmissive film 2 has reflectivity characteristics which are very close to those of Au relative to the laser light of 650 nm wavelength, thus enabling data to be reproduced.

Next, one example of a forming method of the half-transmissive film 22 of Cu oxide is described below with reference to FIG. 2. FIG. 2 shows a sputtering apparatus having a reaction chamber 10. A target comprising Cu oxide, such as CuO or $Cu_2O$, is placed on a cathode 11 in the reactive chamber 10. A substrate holder 12 is disposed opposite to the cathode 11, and the first resin substrate 1 is placed on the substrate holder 12 for depositing a film thereon by sputtering. The apparatus further has a power source 13 for applying a voltage to cathode 11 thereby to generate plasma on the surface of cathode 11, an evacuation pump 14 for causing the inside of the reaction chamber 10 to have a pressure reduced atmosphere, a gas supply system 15 for feeding a sputtering gas into the reaction chamber 10, and a pressure adjusting valve 16 for adjusting vacuum pressure inside the reaction chamber 10.

The half-transmissive film 2 of Cu oxide is formed in the sputtering apparatus constructed as described above in the following way. The reaction chamber 10 is first evacuated with the evacuation pump 14 to a vacuum of $10^{-8}$ Torr. Next, Ar gas is introduced into reaction chamber 10 by the gas supply system 15, pressure is adjusted with a pressure adjusting valve 16 to a vacuum of 0.005 Torr, and high-frequency voltage is applied to the cathode 11 from the power source 13, whereby plasma is generated in the reaction chamber 10 and a film of Cu oxide is deposited on the first resin substrate 1.

Instead of placing Cu oxide such as CuO or $CU_2O$ on the cathode 11 as described above, the target may be Cu, in which case $O_2$ gas as a reactive gas is introduced in addition to Ar gas by the gas supply system 15 and high-frequency or direct current voltage is applied to the cathode 11 from the power source 13, so as to form a film of Cu oxide such as CuO or $Cu_2O$ by reactive sputtering.

Alternatively, it is possible to form a film of Cu oxide, such as CuO or $Cu_2O$, by first depositing a Cu film by sputtering and thereafter subjecting the resin substrate 1 to a high-temperature and high-humidity atmosphere.

Next, a second embodiment of the present invention is described below with reference to FIG. 3, which is a conceptualized cross-sectional view of the optical recording medium of the present invention. Like elements are given the same reference numerals as those in the first embodiment, the descriptions thereof being omitted, and only the differences explained.

Figure 3:
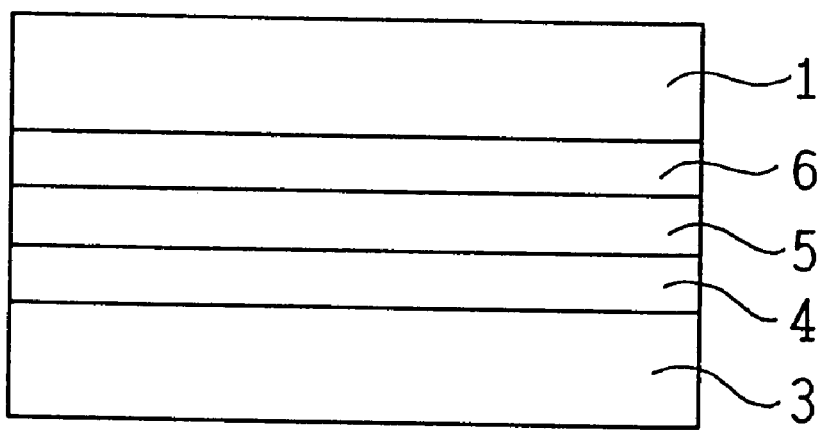
FIG. 3 is a schematic of a partial section of a second embodiment of the optical recording medium according to the present invention.

In FIG. 3, a half-transmissive film 6 includes a compound that comprises Cu mixed with a corrosion-resistant material and is formed on the backside of the first resin substrate 1 by sputtering. The method of forming this half-transmissive film 6 comprising Cu mixed with the corrosion-resistant material is similar to that described with reference to the first embodiment with the sputtering apparatus.

Cu has an index of refraction of 0.13 and absorption coefficient of 3.65 relative to the laser light of a 650 nm wavelength, which are very close to those of Au (refractive index of 0.19 and absorption coefficient of 3.5). Cu thus exhibits reflectivity characteristics similar to those of Au, whereby data stored in the one-sided dual layer disk can be reproduced. In this embodiment, since the film of Cu alone is susceptible to oxidization, a corrosion-resistant material such as Si, Mg, Mn, Cr, Sn, Al, Be or the like is added in a proportion of 25% or less so that the reflectivity characteristics are within the range of from 25 to 30%, thereby enhancing corrosion-resistance.

The content of Al relative to Cu should be between 5 and 30% in weight, since, if the content of Al exceeds 30 wt %, the reflectivity of the film will also be over 30%, which is undesirable. On the other hand, if the content of Al is below 5 wt %, not only will the reflectivity of the film be lower than 25%, but also the film will be more susceptible to deterioration.

Three specific examples (1) to (3) of the composition of half-transmissive film 6 in this embodiment are shown below:
(1) Cu 85 wt %, Si 15 wt %, thickness 80 angstrom
(2) Cu 90 wt %, Al 10 wt %, thickness 80 angstrom
(3) Cu 85 wt %, Si 10 wt %, Al 5 wt %, thickness 80 angstrom.

In the above examples, the thickness of the half-transmissive film 6 should preferably be in the range of from 50 to 150 angstrom.

A third embodiment is described below with reference to FIG. 4, which is a conceptualized cross-sectional view of the optical recording medium of the present invention. Like elements are given the same reference numerals as those in the first embodiment, the descriptions thereof being omitted, and only the differences explained.

Figure 4:
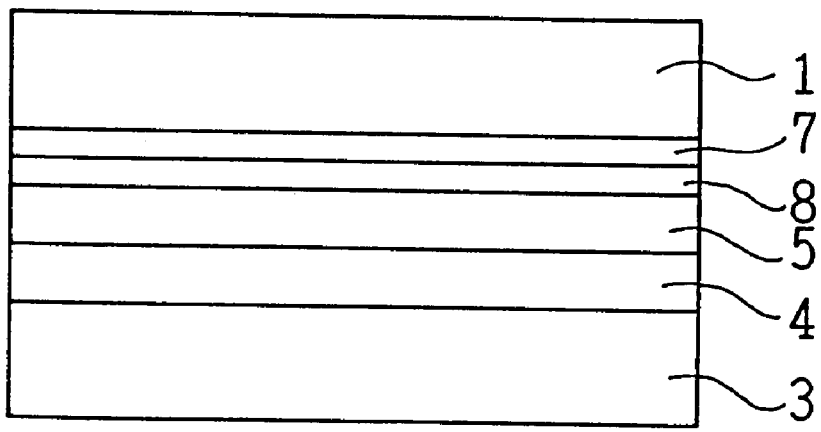
FIG. 4 is a schematic of a partial section of a third embodiment of the optical recording medium according to the present invention.

In FIG. 4, a lower layer film 7 comprising any of Cu, Ag, and Al is formed on the front surface of the first resin substrate 1 by sputtering, and an upper layer film 8, comprising a corrosion-resistant material, is formed on the surface of the lower layer film 7 by sputtering. The lower layer film 7 is deposited in a thickness such that the reflectivity of the film is in the range of from 25 to 30%. For example, in the case of forming a film of Cu, the thickness is set at 120 angstrom, in the case of Ag, the thickness is set at 100 angstrom, and in the case of Al, the thickness is set at 80 angstrom. The upper layer film 8 comprises a corrosion-resistant material such as Si, Mg, Mn, Cr, Sn, Al, Be or the like, and by forming the upper layer film 8 such that its thickness is 30% or less of the thickness of the lower layer film 7, the reflectivity of the film can be maintained in the range 25 to 30%. These upper and lower layer films 7, 8 can be formed using the sputtering apparatus described with reference to the first embodiment.

In this embodiment, the half-transmissive film comprising the lower layer film 7 and upper layer film 8 has reflectivity characteristics that are very close to those of Au, relative to the laser light of 650 nm wavelength, whereby data stored in the one-sided double-layer disk can be reproduced. Moreover, the lower layer film 7, comprising any of Cu, Ag, and Al, is protected from oxidization and corrosion by the upper layer film 8 made of the corrosion-resistant material and the first resin substrate 1.

Figure 5:
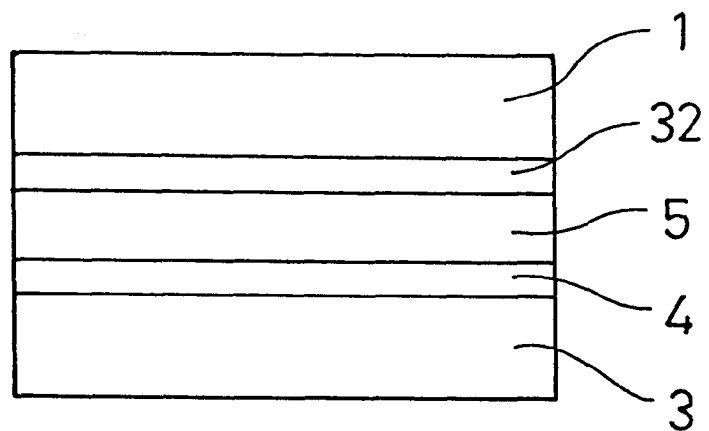
FIG. 5 is a schematic of a partial section of a fourth embodiment of the optical recording medium according to the present invention.

A fourth embodiment is described below with reference to FIG. 5, which is a conceptualized cross-sectional view of the optical recording medium of the present invention. Like elements are given the same reference numerals as those in the first embodiment, the descriptions thereof being omitted, and only the differences explained.

A half-transmissive film 32 comprising ZnS.SiO2 is deposited on the backside of the first resin substrate 1. Such half-transmissive film 32 can be formed using the sputtering apparatus described with reference to the first embodiment.

In this embodiment, by controlling the film thickness, reflectivity characteristics of the half-transmissive film 32 comprising ZnS.SiO2 can be made very close to the reflectivity characteristics of Au, which are 25 to 30% relative to the laser light of 650 nm wavelength, whereby data stored in the one-sided double-layer disk can be reproduced.

Figure 6:
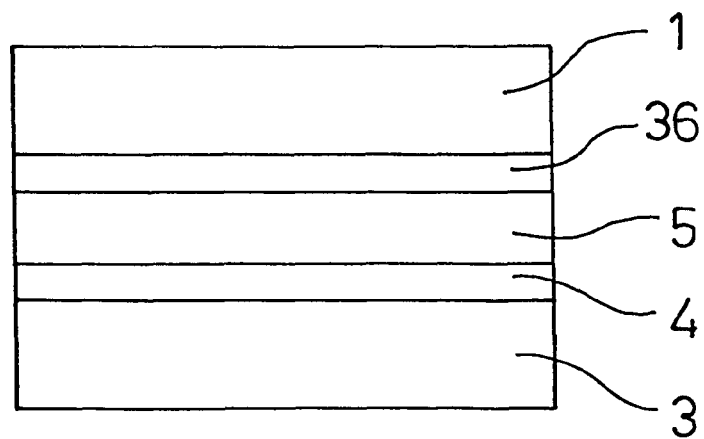
FIG. 6 is a schematic of a partial section of a fifth embodiment of the optical recording medium according to the present invention.

A fifth embodiment is described below with reference to FIG. 6, which is a conceptualized cross-sectional view of the optical recording medium of the present invention. Like elements are given the same reference numerals as those in the first embodiment, the descriptions thereof being omitted, and only the differences explained.

A half-transmissive film 36 comprising TiN is deposited on the backside of the first resin substrate 1. Such half-transmissive film 36 can be formed using the sputtering apparatus described with reference to the first embodiment.

In this embodiment, by controlling the film thickness, reflectivity characteristics of the half-transmissive film 36 comprising TiN can be made very close to the reflectivity characteristics of Au, which are 25 to 30% relative to the laser light of 650 nm wavelength, whereby data stored in the one-sided double-layer disk can be reproduced.

Figure 7:
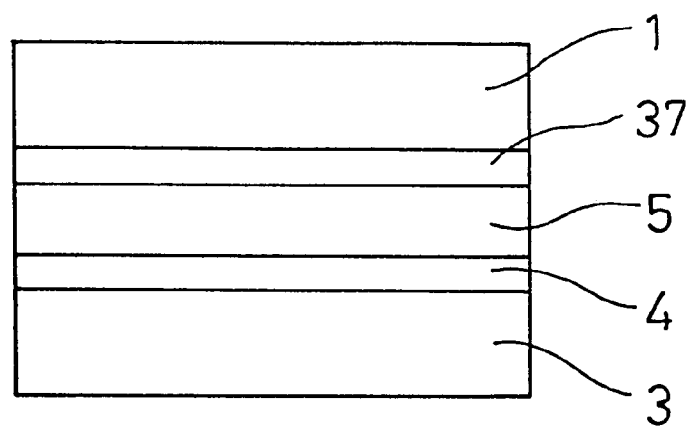
FIG. 7 is a schematic of a partial section of a sixth embodiment of the optical recording medium according to the present invention.

A sixth embodiment is described with reference to FIG. 7, which is a conceptualized cross-sectional view of the optical recording medium of the present invention. Like elements are given the same reference numerals as those in the first embodiment, the descriptions thereof being omitted, and only the differences explained.

A half-transmissive film 37 comprising indium-tin-oxide (ITO) is deposited on the backside of the first resin substrate 1. The indium-tin-oxide in this embodiment is defined by a chemical formula of $In_2O_3+SnO_2$ with the content of $SnO_2$ in the range of from 5 to 10 wt %. Such half-transmissive film 37 of ITO can be formed using the sputtering apparatus described with reference to the first embodiment. While high-frequency voltage is applied in the first embodiment, the film of ITO can be deposited by applying DC voltage.

In this embodiment, by controlling the film thickness, reflectivity characteristics of the half-transmissive film 37 comprising ITO can be made very close to the reflectivity characteristics of Au, which are 25 to 30% relative to the laser light of 650 nm wavelength, whereby data stored in the one-sided double-layer disk can be reproduced.

Figure 8:
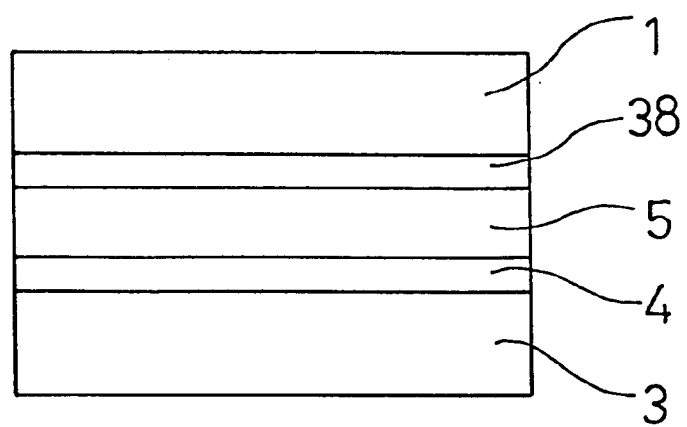
FIG. 8 is a schematic of a partial section of a seventh embodiment of the optical recording medium according to the present invention.
Figure 9A:
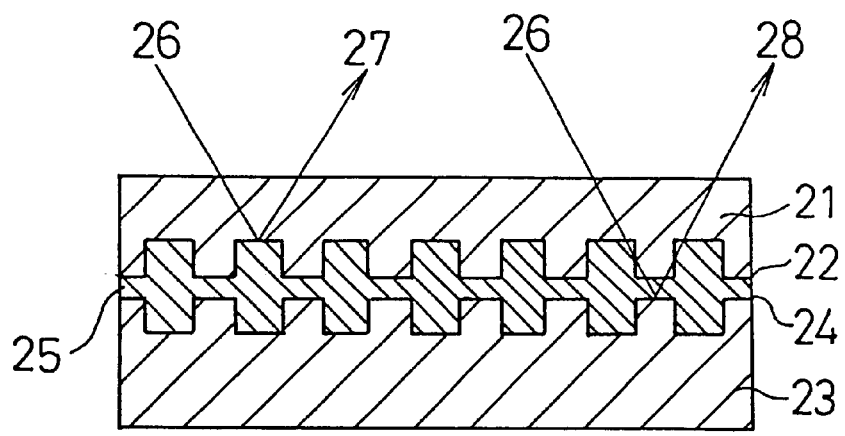
FIG. 9A is a cross-sectional view of a prior art optical recording medium and FIG. 9B is a schematic of a partial section of same.
Figure 9B:
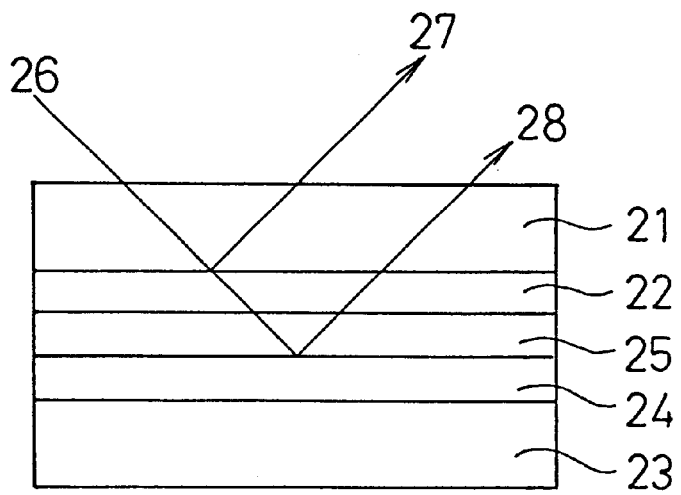

A seventh embodiment is described below with reference to FIG. 8, which is a conceptualized cross-sectional view of the optical recording medium of the present invention. Like elements are given the same reference numerals as those in the first embodiment, the descriptions thereof being omitted, and only the differences explained.

A half-transmissive film 38 comprising an alloy of Au and Cu or a compound comprising a plurality of elements including Au and Cu is deposited on the backside of the first resin substrate 1. Such half-transmissive film 38 of Au—Cu alloy or a compound including Au and Cu can be formed using the sputtering apparatus described with reference to the first embodiment. While high-frequency voltage is applied in the first embodiment, the film of Au—Cu alloy or a compound including Au and Cu can be deposited by applying DC voltage.

In this embodiment, the film of Au—Cu alloy or a compound including Au and Cu has an index of refraction of 0.13 and absorption coefficient of 3.65 relative to the laser light of 650 nm wavelength, which are very close to the reflectivity characteristics of Au (refractive index of 0.19 and absorption coefficient of 3.5). By setting the film thickness to be equal to the thickness of a single layer of Au, the reflectivity characteristics of the half-transmissive film 38 can be made 25 to 30% relative to the laser light of 650 nm wavelength, whereby data stored in the one-sided double-layer disk can be reproduced. Moreover, by reducing the mixing proportion of Au, the material cost is decreased.

Two specific examples of the composition of alloy constructing the half-transmissive film 38 in this embodiment are shown below:
(1) Au 50 wt %, Cu 50 wt %/o, thickness 130 angstrom (preferable range being 100 to 150 angstrom)

(2) Au 40 wt %, Cu 40 wt %, Al 20 wt %, thickness 110 angstrom (preferable range being 80 to 150 angstrom).

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An optical recording medium having a half-transmissive film including an oxide of Cu.

2. An optical recording medium having a half-transmissive film including Cu mixed with a corrosion-resistant material.

3. The optical recording medium according to claim 2 wherein the corrosion-resistant material comprises one or a plurality of elements selected from a group consisting of Si, Mg, Mn, Cr, Sn, Al, and Be.

4. The optical recording medium according to claim 2 wherein the corrosion-resistant material is added in a proportion of 25% or less so that the reflectivity of the half-transmissive film is 25 to 30% at a 650 nm wavelength.

5. An optical recording medium having a half-transmissive film which comprises a stack of layers including an upper layer of a corrosion-resistant material and a lower layer of any of elements selected from a group consisting of Cu, Ag, and Al.

6. The optical recording medium according to claim 5 wherein the lower layer of the half-transmissive film has a thickness such that the reflectivity of the half-transmissive film is 25 to 30% at a 650 nm wavelength.

7. The optical recording medium according to claim 5 wherein the corrosion-resistant material comprises one or a plurality of elements selected from a group consisting of Si, Mg, Mn, Cr, Sn, Al, and Be.

8. The optical recording medium according to claim 5 wherein the upper layer of the half-transmissive film has a thickness 30% or lower of the thickness of the lower layer.

9. An optical recording medium having a half-transmissive film including a nitride of Ti.

10. An optical recording medium having a half-transmissive film including indium-tin-oxide.

11. An optical recording medium having a half-transmissive film including one of an alloy of Au and Cu and a compound comprising a plurality of elements including Au and Cu.

* * * * *